Nov. 30, 1965   R. F. GILL, JR   3,220,105
MANUFACTURE OF SEALS
Filed March 1, 1962

INVENTOR.
ROBERT F. GILL, JR.
BY
Wallace Kinzer and Dorn
ATTORNEYS

United States Patent Office 3,220,105
Patented Nov. 30, 1965

3,220,105
MANUFACTURE OF SEALS
Robert F. Gill, Jr., La Grange, Ill., assignor to Scully-Anthony Corporation, La Grange, Ill., a corporation of Illinois
Filed Mar. 1, 1962, Ser. No. 176,744
7 Claims. (Cl. 29—470)

This invention relates to the manufacture of feedthrough structure for electrical enclosure parts and other or related electrical parts.

In the formation of glass-to-metal seals in certain electrical parts, such as bases for electrical enclosures, connectors, or the like, it is customary, while the vitreous component of the feedthrough structure is being matured, or while the ceramic element is being brazed or soldered in position, to support the metallic pin, the non-matured glass section, and the supporting member or base in an accurately formed jig or the like which assures accurate positioning of the parts during the time-temperature cycle required for maturing the vitreous component of the feedthrough structure.

Customarily, the jig or support structure is accurately constructed of carbon, graphite, ceramic, or other suitable refractory material which will maintain the needed degree of accuracy when positioning the elements during the maturing or temperature-time cycle.

In those situations where the entailed thermal expansion coefficients are very small, an appreciable degree of leniency can be tolerated in the accuracy requirement of the jigs or other support structures, but where the materials possess relatively high thermal expansion coefficients, the tolerances allowable on dimensions are more exacting.

For example, in the fabrication of metal-to-glass-to-metal feedthrough from high thermal expansion materials such as aluminum or copper, the problem of accuracy or precision in the support of the feedthrough during the time-temperature maturing cycle is compounded, and in this instance very accurately formed support structures are required in order that there shall be no movement of the conductor with respect to the vitreous and adjacent metallic components during the maturing cycle.

Therefore, in the formation of glass-to-metal feedthroughs in glass-to-aluminum or glass-to-copper systems, the ordinary requirement is that highly accurate jigs or support structures be formed of materials with thermal expansion coefficients closely adjusted to the materials involved in the supported, feedthrough system.

Certain feedthrough structures including low thermal expansion materials are known. These structures, because of the low thermal expansion characteristics involved, can be supported in relatively inaccurate carbon, graphite or refractory metal supports. However, there are inherent problems and economically unattractive factors entailed in the construction, maintenance or salvage of the support structure, due to wear, distortion, oxidation, and other degenerative processes which diminish the accuracy of the support structure during repeated use.

It is an object of the present invention to avoid the disadvantages of the conventional method of supporting glass-to-metal or ceramic-to-metal structures during the temperature-time cycle required for securing adequate bonding between the vitreous component and metal or other compouents in the feedthrough structures involved.

A further object of the present invention is to support any compound structure, involving vitreous-to-metal, ceramic-to-metal or metal-to-metal bonding, during the time when the components may readily move in their relative positions while the vitreous or brazing components of the system are in a fluid or plastic state.

Another object of the invention is to compensate for thermal expansion, and particularly differential expansion, in the parts of a metal-glass feedthrough structure, during firing, by means which does not require any precision supporting structure.

Other and further objects of the present invention will be apparent from the following description and claims and are illustrated in the accompanying drawing which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figure 1:
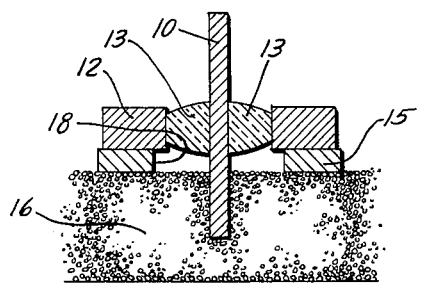
FIGS. 1 to 4 are sectional views illustrating various modes of practicing the present invention.

Under the present invention, a conductor or electrical lead element consisting of a conductive pin 10, FIG. 1, is associated with a base or support plate 12, and is isolated therefrom in an insulated relationship by a vitreous or ceramic seal component 13. These three parts in their assembled state represent the electrical feedthrough structure, noting that at this stage of incomplete manufacture, the seal component 13, even though it is interposed between and in effect joins the conductor 10 and the support plate 12, is not matured. It is in a "green" or immature, unfused state, such that the feedthrough structure 10–12–13 as a whole is not completely manufactured until after the "green" seal component 13 has been fused, vitrified or advanced in a time-temperature cure cycle.

A support or spacing element is illustrated at 15 and this support reposes freely on a bed of loose, granular free-flowing material 16. The support 15 is washer-like in shape, and the opening 18 therein permits the free end of the conductor 10 to be extended therethrough and implanted in the granular bed 16 to a depth where the lower surface of the base plate 12 rests on the upper surface of the support 15. The assembly can then be fired for the time period and at the temperature required to advance the seal component to its desired end state.

The support material 16 is a suitable inorganic granular material of appropriate thermal conductivity, and of such density as to support the pin 10 in a relatively constant position in respect to the other components of the feedthrough structure during the temperature-time cycle required for maturing the vitreous, ceramic or other insulating component 13. This occurs while the system is at an elevated temperature, during which time the vitreous component 13 is in a semi-fluid or plastic condition conducive to tipping or leaning of the pin 10. The vitreous component may, for example, be of the composition disclosed in co-pending application Serial No. 124,339, filed July 17, 1961, now abandoned, which also discloses the order of the time-temperature cure cycle required to mature the seal.

Alternatively, the seal member 13 might be a previously formed component which does not attain a fluid or mobile state during the maturing cycle, but which is to be bonded to the plate 12 in a brazing or other high-temperature bonding process in which the conductor element is advantageously stabilized, in a physical sense, against tipping, as hereinafter disclosed.

It will be apparent that relatively high thermal expansions may occur in the feedthrough parts 10, 12 and 13 during the maturing cycle. This must be permitted to occur without significantly affecting the position of the pin 10 with respect to the surrounding part 12. It is not necessary that the base 12 present the same thermal expansion as the support 15. In fact, the support 15, independent of the feedthrough structure, need not be formed with the dimensional precision required for the base 12. It is only necessary that the thermal expansion of the base or collar 12 is not restrained by the support element 15 by confinement or by asymmetrical friction effects during the thermal cycling.

As noted, the granular material 16 supports the pin 10 against vertical movement or tilting. Its composition should be such that it does not adhere tightly to the pin 10, either through fusion or chemical reaction. Moreover, the granular base or bed 16 should be of a density adequate to support the pin. Advantageously, the material for the bed 16 is of such thermal conductivity that the lower surface of the ceramic material 13 is not thermally insulated during the maturing cycle. Materials having these attributes are hereinafter specified.

The function of the support 15 is principally to provide such support for the base 12 as to elevate the seal component above the granular base 16 during the thermal cycling, since it is possible for the vitreous or ceramic component to react with or adhere to the granular base. As will be pointed out hereinafter, the support 15 may take other forms.

The support 15 shown in FIG. 1 is essentially washer-shaped, and rests directly on the granular material. Neither qualification is essential. Thus, the support can be in the form of a cup 15A, FIG. 2, containing the bed of granular refractory material. The rim 15F of the cup 15A is so disposed as to afford a ledge raised above the upper surface of the granular base 16 and on which a flange 12F of a multiple-apertured feedthrough base 12A is supported. Feedthrough pins 10 are arranged in the apertures of the base 12A, and the free ends thereof are implanted in the granular base as in the foregoing embodiment and those hereinafter described. Ceramic seals 13 are proveded in the apertures to embrace the two pins 10 and join the same to the adjacent surfaces of the base 12A.

Figure 2:
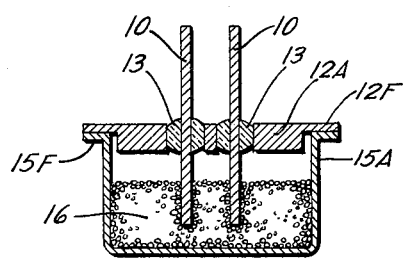
Figure 3:
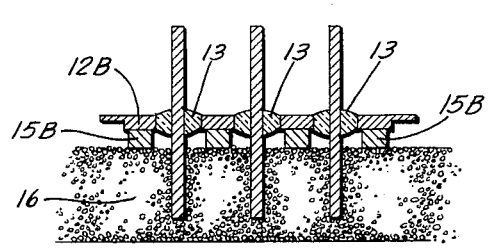

The arrangement shown in FIG. 3 combines characteristics of FIGS. 1 and 2. Thus, a multiple aperture base 12B of the type described in connection with FIG. 2 is elevated above the bed 16 of granular material by a multiple-aperature washer-type support 15B. It will be seen that the number of apertures in the feedthrough base and the support for receiving the conductor pins as 10 can be any practical or necessary number.

Figure 4:
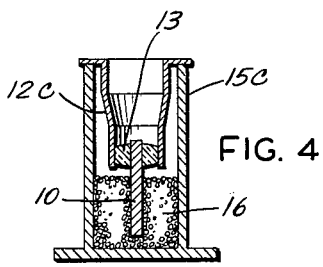

FIG. 4 demonstrates how the present invention may be practiced when diminutive, narrowly confined parts are involved. The reference character suffixes identify the counterparts of what has been described above.

Figure 6:
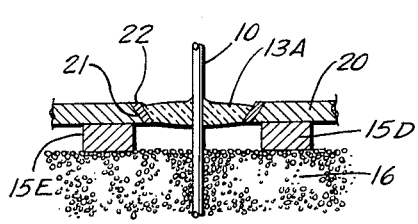
FIGS. 6 and 6A are sectional view illustrating other embodiments of the present invention.
Figure 5:
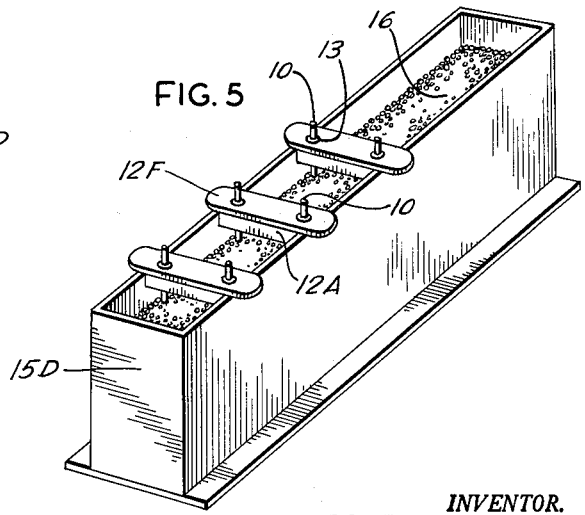
FIG. 5 is a somewhat schematic perspective view illustrating further extensions of the present invention.

Referring to FIG. 5, a single large support 15D is used as a tray for supporting numerous individual feedthrough bases of the kind 12A described above, and in the manner characteristic of the present invention. As noted above, the practices of the present invention are applicable to brazing operations at elevated temperatures, and in this connection attention is directed to FIG. 6 illustrating a typical procedure of this kind. The pin 10 is surrounded by a seal component 13A which is in direct contact with the conductor element 10.

The seal component 13A is provided with a metallic surface concentric about and in contact with the outer periphery thereof in order to braze the seal component as 13A to the base 20 in the manner hereinafter disclosed.

The feedthrough structure in FIG. 6, including the conductor element 10 and the seal component 13A, is also inclusive of a header or so-called base 20 having an opening 21, which may be tapered, formed therein. The periphery of the seal 13A may likewise be tapered or wedge-shaped in nature, and a metallic coating is in intimate contact with the outer periphery of the seal 13A, being of such nature as to be joined in a brazing operation to the tapered wall 21 of the base 20. It will be appreciated that the braze metal 22, that is adherent to the seal 13A, and the base 20 are in contact along the tapered wall 21 as an incident to facilitating positioning of the seal 13A and the conductor element 10 that is associated therewith.

As in the foregoing embodiment, the pin 10 is stabilized against movement during the thermal cycling required to complete the braze and mature the seal as a consequence of implanting the pin 10 in a bed of loose, free-flowing material 16 refractory to the elevated temperature required to produce fusion of the braze metal 22 to the base 20, and fusion of the ceramic to the pin. In order to maintain separation between the feedthrough structure, other than the pin 10, and the refractory material 16, a separator or feedthrough support is interposed between and in contact with the granular bed 16 and the base 20.

Figure 6A:
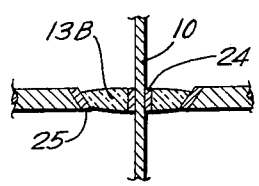

Again referring to FIG. 6, and to FIG. 6A, it is possible to perform a verified seal 12B having an opening, for the pin 10, lined with a metallurgical surface 24 brazeable to the pin 10, in addition to a similar surface 25 about the outer periphery brazeable to the base as 20. The time-temperature cycle then would be merely that required to complete the braze, joining the base to the seal, and the seal to the pin by fusion. The granular bed in this instance safeguards the pin or conductor element from longitudinal movement when the braze metal 24 softens or fuses.

It has been found that irrespective of the degree of complexity regarding the number of conductors or pins, as depicted in FIGS. 2 and 3, the accuracy of pin positioning is maintained during the maturing cycle in spite of the ceramic seal component passing through a plastic state which typifies one stage in its thermal advancement or cure. It is verified by trial that the free-flowing nature of the granular material 16 accommodates such horizontal movement of the conductors as 10 in a base structure, as may be induced by the thermal expansion factors involved, in such a manner that the desired accurate positioning of the pin relative to its base is not disturbed, even though there be a large number of pins in one integral feedthrough base.

In some cases it has been found advantageous to limit the volume (and therefore the insulating effect) of supporting granular material, as depicted in FIG. 4, due to requirements of rapid-rate thermal cycling for a given vitreous, ceramic or ceramo-glass insulating material. Thus, the rate of change in the temperature of the seal component during maturing can be determined by judicious selection of the volume and thermal characteristics of the granular bedding material such as the thermal conductivity and specific heat properties. Suitable granular materials are commercially available in a considerable choice of thermal expansions where this is of advantage for the large and elaborate structures involving many conductors in a single plate or header. Suitable refractory materials are: beryllium oxide, silicon carbide, alumina, quartz and zirconia, in descending order of high thermal conductivity. On the basis of density, and consequent ability to support a heavy pin or conductor, the order of preference in zirconia, alumina, silicon carbide and quartz or silica sand.

While refractory oxides are ordinarily used to advantage in the described process because of cost considerations and availability, it is obvious that other granular refractory materials are quire suitable, such as refractory metal compounds. Such includes borides, nitrides, silicides and like metallic or cerametallic materials. In any event, specific materials not here listed by specific example should not be considered as unequivalent materials which depart from the spirit of the invention or the primary objectives thereof.

The method described is capable of application either in static maturing cycles or in those systems in which the structures to be mateured are conveyed mechanically through the environment in which the temperature-time cycling is accomplished. The present invention is also independent of the mode for establishing the necessary temperature, as by heat from radiation, conduction, induction and the like.

Hence, while there has been reference herein to the preferred embodiments of the present invention, it will be understood that these are capable of variation and modification, and I therefore do not wish to be limited to the precise details set forth, but desire to avail myself of such changes and alterations as fall within the purview of the following claims.

I claim:

1. A method of completing one phase in the effective manufacture of structure inclusive of a base and an element of pin-like form joined together in an insulated relationship by a seal component in an unfinished state, said seal component requiring treatment at an elevated temperature for effective bonding to the base and the pin-like element, characterized by: affording a bed of loose, free-flowing granular material refractory to the temperature required for treatment of said seal component as aforesaid; arranging above said bed a fixed base support having an opening therein for receiving said pin-like element; setting said base, having the seal in its unfinished state, on the support with the free end of said element projected through said opening; implanting said free end of said element in said bed of granular material with said base and the seal component elevated above the bed of granular material so as to be out of contact therewith; and thereafter heating said structure having the base supported as aforesaid to effect the bonding of the seal component.

2. A method according to claim 1 wherein the seal component is a vitreous component requiring treatment at and elevated temperature in order to mature the seal.

3. A method according to claim 1 wherein the seal component is one that is to be brazed in place at the elevated temperature.

4. A method of completing one phase in the effective manufacture simultaneously for a large number of electrical feedthrough structures each inclusive of a metallic base and a metallic conductor element of pin-like form joined together in an insulated relationship by a matured glass seal component, said glass seal component being initially in a green or immature state in the assembled but unfinished structure, characterized by: affording a bed of loose, free-flowing granular material, refractory to the temperature required to mature said seal component, and selected from the group consisting of refractory oxides and refractory metal compounds; arranging above said bed fixed means support for the bases of the assembled structures, said support means having an opening therein for receiving the free end of the conductor element; setting said bases, each having the seal component in its immature state, on the support means with the free end of each conductor element projected through said opening; implanting the free ends of the conductor in said bed of granular material with each of said bases and the related seal component elevated above the bed of granular material whereby each base and the related seal component are out of contact with said bed of granular material; and thereafter simultaneously heating all the feedthrough structures supported as aforesaid to advance each seal component to its matured state, thereby to this extent simultaneously completing the manufacture of the feedthrough structures.

5. A method of manufacturing a structure inclusive of a base and an element of pin-like form joined together by a seal component, initially in an unfinished state in the incompletely manufactured structure, characterized by: affording a bed of loose, free-flowing granular material refractory to the temperature required to render said seal component effective; supporting said structure including the seal component in its unfinished state above said bed with the pin-like element implanted in said bed of granular material with said base and seal component elevated above the bed of granular material whereby the base and seal component are out of contact with said bed of granular material; and thereafter heating the structure supported as aforesaid to advance the seal component to its unfinished state.

6. A method of manufacturing electrical feedthrough or like structure inclusive of a base and an element of pin-like form joined together in an insulated relationship by a matured seal component, initially in a green or immature state in the incompletely manufactured structure, characterized by: affording a bed of loose, free-flowing granular material refractory to the temperature required to mature said seal component; arranging above said bed a fixed support for the base element of said structure; setting said base of the structure, including the seal component in its immature state, on the support with the pin-like element thereof implanted in said bed of granular material with said base and seal component elevated above the bed of granular material whereby the base and seal component are out of contact with said bed of granular material; and thereafter heating the structure supported as aforesaid to advance the seal component to its matured state.

7. A method of fabricating a structure from a base having a recess therein, a pin-like element projecting into said recess, and a seal element in an unfinished state requiring treatment at an elevated temperature for effective bonding to the base, said method comprising: arranging a fixed support above a bed of loose free-flowing granular material that is refractory to the temperature required for treatment of the seal element as aforesaid, said fixed base support having an opening therein for receiving said pin-like element with substantial clearance; disposing the base on the support with the seal element located in alignment with the base and with a free end of the pin-like element projecting into said recess; implanting the free end of said pin-like element in the bed of granular material with said base and seal component elevated above the bed of granular material whereby the base and seal component are out of contact with said bed of granular material; and thereafter heating said structure at an elevated temperature to bond the seal element to the base and to the pin-like element as aforesaid.

References Cited by the Examiner

UNITED STATES PATENTS

| | | | |
|---|---|---|---|
| 2,813,502 | 11/1957 | Drom | 29—498 |
| 2,837,855 | 6/1958 | Hoke | 41—12 |
| 2,957,235 | 10/1960 | Steinberg | 29—424 |
| 2,960,419 | 11/1960 | Emeis | 29—493 |
| 3,088,299 | 5/1963 | McMahon et al. | 29—464 |

JOHN F. CAMPBELL, *Primary Examiner.*